United States Patent
McKinney et al.

(10) Patent No.: US 7,974,622 B1
(45) Date of Patent: Jul. 5, 2011

(54) PROVISIONING SYSTEM FOR FIXED VS. NOMADIC WIRELESS SERVICES

(75) Inventors: David U. McKinney, Olathe, KS (US); Tim L. Swan, Lees Summit, MO (US); John E. Belser, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 942 days.

(21) Appl. No.: 11/623,507

(22) Filed: Jan. 16, 2007

(51) Int. Cl.
*H04W 4/00* (2009.01)

(52) U.S. Cl. ..... 455/433; 455/410; 455/411; 455/432.3; 455/435.1

(58) Field of Classification Search ............... 455/41.1, 455/410, 411, 414.1, 414.2, 415, 424, 425, 455/432.3, 433, 435.1, 552.1
See application file for complete search history.

(56) References Cited

U.S. PATENT DOCUMENTS

| | | | | |
|---|---|---|---|---|
| 7,657,282 B2 * | 2/2010 | Suzuki et al. | | 455/552.1 |
| 2002/0108062 A1 * | 8/2002 | Nakajima et al. | | 713/201 |
| 2003/0212800 A1 * | 11/2003 | Jones et al. | | 709/228 |
| 2005/0036478 A1 * | 2/2005 | Neilson et al. | | 370/350 |
| 2005/0076244 A1 * | 4/2005 | Watanabe | | 713/201 |
| 2005/0277417 A1 * | 12/2005 | Yoon et al. | | 455/436 |
| 2006/0068777 A1 * | 3/2006 | Sadowsky et al. | | 455/427 |
| 2006/0146750 A1 * | 7/2006 | Chen et al. | | 370/331 |
| 2006/0148402 A1 * | 7/2006 | Hagiwara | | 455/41.1 |
| 2006/0194590 A1 * | 8/2006 | Shoki et al. | | 455/456.1 |
| 2007/0036120 A1 * | 2/2007 | Zhang et al. | | 370/338 |
| 2007/0097889 A1 * | 5/2007 | Wang et al. | | 370/281 |
| 2007/0298761 A1 * | 12/2007 | Bani Hani | | 455/404.2 |
| 2008/0085725 A1 * | 4/2008 | Grayson et al. | | 455/456.1 |
| 2009/0019284 A1 * | 1/2009 | Cho et al. | | 713/170 |
| 2009/0024848 A1 * | 1/2009 | Takasugi et al. | | 713/169 |

OTHER PUBLICATIONS

Newton, Newton's Telecom Dictionary, Flatiron Publishing, 23rd, p. 574.*

* cited by examiner

*Primary Examiner* — Dominic E Rego

(57) ABSTRACT

A method, system, and computer-readable media are provided for authorizing a device to authenticate onto a network from a base station. The method includes receiving a first identifier of a device and receiving a second identifier of a base station. Furthermore, the method includes determining if the device is authorized to authenticate onto the network from the base station based on an evaluation of the first and second identifiers. Additionally, the method includes authorizing the device to authenticate onto the network when it is determined that the device is authorized to receive service at the base station.

17 Claims, 4 Drawing Sheets

PROVISIONING SYSTEM FOR FIXED VS. NOMADIC WIRELESS SERVICES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

When it comes to wireless service needs, everyone's requirements may not be the same. Some individuals, companies, or entities may need to receive wireless service at multiple geographic locations because, for example, their business periodically changes locations on a regular basis. However, others may be content with receiving wireless service at one particular geographic location. A wireless service provider may wish to be able to satisfy all service requirements of its customers, whether it be for one service location (fixed) or for multiple service locations (nomadic). As such, it may be necessary to manage all users to ensure that each individual subscriber can receive their own customized wireless service package.

Currently, there does not exist a system or method to exploit the provisioning of fixed and nomadic services for high speed wireless data (HSWD) platforms. There exists a need for a provisioning system to manage and provide customized wireless service packages that meet the needs of individual users. Such a provisioning system could be configured to allow or disallow wireless service at different geographic locations based on the type of wireless service a customer has registered for and paid to receive. With the ability to monitor and manage users with a diverse wireless service needs, a wireless service provider can be in a better position to create a reasonable pricing mechanism for charging its customers based on the type of service a user wishes to receive.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present invention is defined by the claims below. Embodiments of the present invention solve at least the above problems by providing a system and method for, among other things, authorizing a device to authenticate onto a network from a base station.

In a first aspect, one or more computer-readable media are provided to execute a method of authorizing a device to authenticate onto a network from a base station. The executed method includes receiving a first identifier of a device and receiving a second identifier of a base station. Furthermore, the executed method includes determining if the device is authorized to authenticate onto the network from the base station based on an evaluation of the first and second identifiers. Additionally, the executed method includes authorizing the device to authenticate onto the network when it is determined that the device is authorized to receive service at the base station.

In another aspect, a system is provided for authorizing a device to authenticate onto a network from a base station. The system includes devices containing device identifiers, and base stations containing a base station identifiers. Moreover, the system includes a provisioning manager for associating users, device identifiers, types of requested service, and locations for service together in a database, authorizing devices to authenticate onto a network from a base station when it is determined that the device is authorized to receive service at the base station, and disallowing the device to authenticate onto the network from the base station when it is determined that the device is not authorized to receive service at the base station.

In yet another aspect, one or more computer-readable media are provided to execute a another method of authorizing a device to authenticate onto a network from a base station. The executed method includes receiving a request for a type of service, and receiving device identifiers of devices. The executed method further includes receiving a set of information about locations for service for each of the devices, and associating the device identifiers with the set of information within a database. Additionally, the executed method includes accessing the database to determine if a first device is authorized to authenticate onto a network from a base station, and authorizing the first device to authenticate onto the network when it is determined that the first device is authorized to receive service at the base station.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Figure 1:
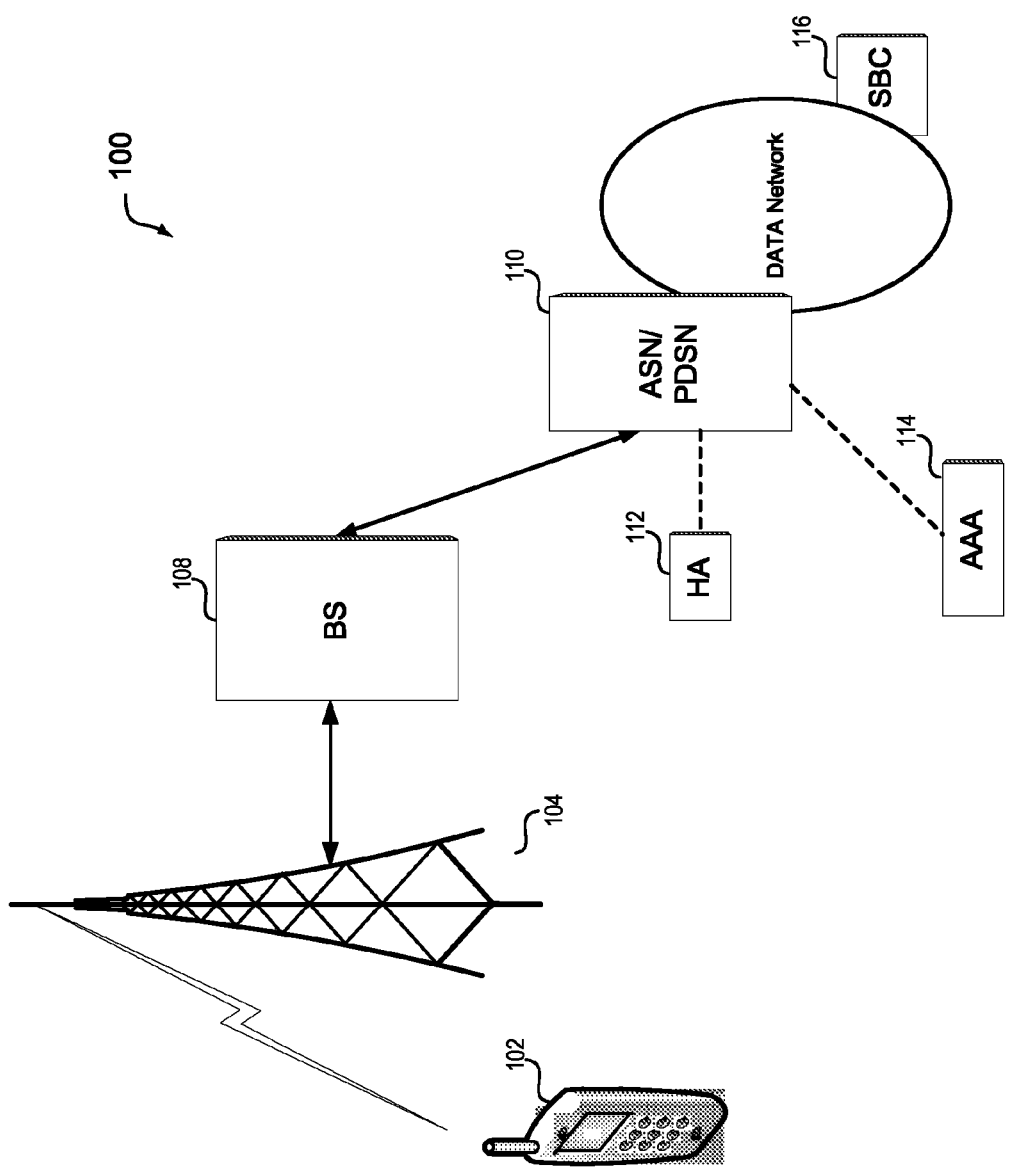
FIG. 1 is block diagram of an embodiment of a communication network that can be employed by the invention.

FIG. 1 is block diagram of an embodiment of a communication network 100 that can be employed by the invention. Mobile device 102 may be or can include a laptop computer, a network-enabled mobile telephone (with or without media capturing/playback capabilities), a wireless email client, a personal digital assistant (PDA), or other software client. The mobile device 102 may also include a machine or device to perform various tasks including video conferencing, web browsing, search, electronic mail (email) and other tasks, applications and functions. Mobile device 102 may additionally be a portable media device such as digital camera devices, digital video cameras (with or without still image capture functionality), media players such as personal music players and personal video players, and other portable media devices. The mobile device 102 can include a communication interface that can allow the mobile device 102 to transmit information via radio signals to a communication tower 104.

The Base Station (BS) 108 contains equipment for transmitting and receiving radio signals (transceivers) from a communication tower 104. BS 108 also has other equipment for encrypting and decrypting communication with the mobile device 102. The BSC 108 may be configured to receive a radio signal that is converted into Time Division Multiplexing (TDM). The BS 108 may handle the allocation of radio channels and may receive measurements from mobile devices. The BS 108 may also be configured to send voice information from the TDM signal to a Mobile Switching Center (MSC) and data information to an Access Service Network (ASN) or a Packet Data Serving Node (PDSN) 110.

The ASN/PDSN 110 may be a component of a mobile network. The ASN/PDSN 110 may act as a connection point between the Radio Access and Internet Protocol (IP) networks. The ASN/PDSN 110 component may be responsible for managing Point-to-Point Protocol (PPP) sessions between the mobile device's core IP network and the mobile device. The Home Agent (HA) 112 may be a router located in a home network of the mobile device 102. The HA 112 allows a mobile device to connect to the Internet or data network by assigning an IP address and binding it to a Care-of-Address (COA). The HA 112 can forward packets to an appropriate network when a mobile device is away from its home area or home network. An authentication, authorization, and accounting (AAA) server 114 is a server program that handles user requests for access to a network and provides AAA services. The AAA server 114 may interact with network access servers, gateway servers, databases, and directories containing user information. A Session Border Controller (SBC) 116 may be a device used in some Voice over Internet Protocol (VoIP) networks to exert control over the signaling and media streams involved in setting up, conducting, and tearing down calls. The SBC 116 may be put into the signaling and/or media path between the party making a call and the party receiving the call. In an embodiment, the SBC 116 may act as a VoIP phone when it receives a call from a calling party, and can place a second call to the called party. The effect of this behavior may be that the signaling traffic and media traffic (voice, video, etc.) crosses the SBC. This behavior may also be prevalent during conference communications.

Figure 2:
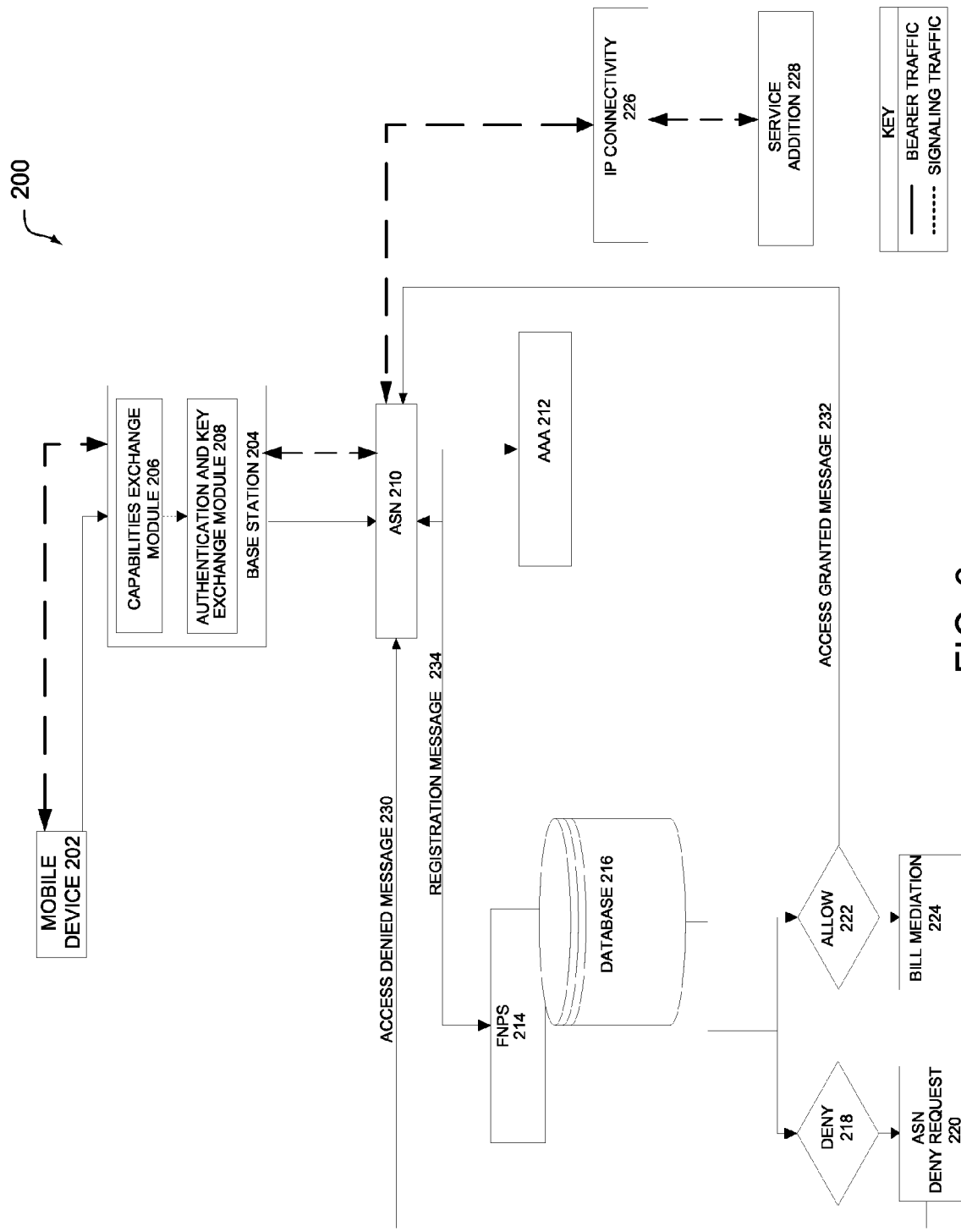
FIG. 2 is a block diagram of an embodiment of a system for implementing the invention.

FIG. 2 is a block diagram of an embodiment of a provisioning system 200 for implementing the invention. The provisioning system 200 is designed to prevent or allow nomadic and fixed high-speed wireless data (HSWD) services at various geographic locations. Initially, a user may register himself/herself with a wireless service provider by choosing to purchase a fixed or nomadic HSWD service from a wireless service provider. A fixed HSWD service would limit the user to obtaining wireless service at one specific location, while a nomadic HSWD service would allow the user to receive wireless service at multiple locations. A user may also choose a fully-mobile type of nomadic HSWD service which would allow the user to receive wireless service at all locations provided by the wireless service provider. The service provider may choose to price the different types of service differently based the convenience and capabilities provided by each type of service. For example, the fully-mobile nomadic HSWD service may be the most expensive type of service plan because it provides users with the most flexibility, as it can be used at all locations supported by the wireless service provider. The nomadic HSWD service may be the second-most expensive service plan because it is the second-most flexible plan, as the user may receive service at multiple locations but not as many as the fully-mobile service plan. The price of the nomadic HSWD service plan may vary based on the number of geographic locations the user wishes to receive service. The fixed HSWD service plan may be the least expensive because it provides the lowest amount of flexibility as the user can only receive wireless service at one location.

When registering, the user may provide other information such as the Media Access Control identifiers (MAC IDs) of the devices under his/her use, and geographic location information of where they would like to receive service. Additionally, the user may provide the BS location identifiers (BS IDs) of the base stations that will service the geographic locations that the user wishes to receive service. Alternatively, the service provider may have access to a list of BS IDs and corresponding geographic locations, and can determine which BS IDs the user will need based on the geographic locations the user submits. The registration information can be included in a registration message 234 and can be transmitted to the Fixed/Nomadic Provisioning System (FNPS) 214. Once the registration information has been received from the user, the registration information can be combined and associated with the user's basic user profile and stored in database 216.

Once registered, a user may subsequently use a mobile device 202 to access a wireless network supported by the wireless service provider. When accessing the wireless network, the mobile device may initially contact a neighboring BS 204. Capabilities exchange module 204 is utilized to receive the capabilities of the mobile device 202 which may include bursts that the mobile device can support for modulation and coding. Authentication and key exchange module 208 is utilized to aide the mobile device 202 and BS 204 in authenticating each other. Using module 208, Traffic Encryption Keys (TEK) are exchanged between the mobile device 202 and the BS 204 to encrypt user traffic data.

Access Service Network (ASN) 210 serves as a gateway from the wireless network to the service provider's wired network. When the mobile device 202 attempts to authenticate itself onto the wireless network via the BS 204, the ASN 210 will receive a MAC ID from the mobile device and a BS ID from the BS. The ASN 210 can contact the Fixed/Nomadic Provisioning System (FNPS) 214 and send the MAC ID and BS ID to the FNPS so it can determine whether or not the ASN should allow the mobile device to authenticate onto the wireless network from the location of the BS 204. Once the FNPS 214 receives the MAC ID and the BS ID, it can examine the database 216 to see if both IDs are associated with each other within the database. If the FNPS 214 determines that the MAC ID and BS ID are not associated with each other, meaning that the mobile device 202 is not authorized to receive service at the location of the BS 204, then the mobile device's request to authenticate onto the network is denied at operation 218. An ASN deny request 220 is then generated, and an Access Denied message 230 is generated and transmitted to the ASN 210 informing it to disallow the mobile device 202 from authenticating onto the wireless network from BS 204.

However, if the FNPS determines that the MAC ID and BS ID are associated with each other, meaning that the mobile device 202 is authorized to receive service at the location of the BS 204, then the mobile device's request to authenticate onto the network is allowed at operation 222. An Access Granted message 232 is generated and transmitted to the ASN 210 informing it to allow the mobile device 202 to authenticate onto the wireless network from BS 204. Various billing structures can be implemented at billing mediation operation 224 based on, for example, the number of times the user has been approved to authenticate onto the wireless network and the type of HSWD service the user registered to receive.

Once the ASN 210 receives the Access Granted message 232, the ASN can allow the mobile device to continue to proceed to an authentication process onto the wireless network. The authentication process may be, for example, a Worldwide Interoperability for Microwave Access (WiMAX) authentication process. In this process, the AAA server 212 is utilized to authenticate the mobile device 202 onto the wireless network. If the mobile device 202 is authenticated by the AAA server 212, the mobile device can obtain Internet Protocol (IP) connectivity at operation 226 by requesting an IP address from the network by sending a Dynamic Host Configuration Protocol (DHCP) to the network of the service provider. The network then allocates an IP address for the mobile device 202 and sends the IP address to the mobile device. At the Service Addition operation 228, the mobile device 202 has obtained a Radio Frequency (RF) connection and an IP address, and can now initiate services such as VoIP, Internet access over the network, or any other IP services that the user registered to receive.

Figure 3:
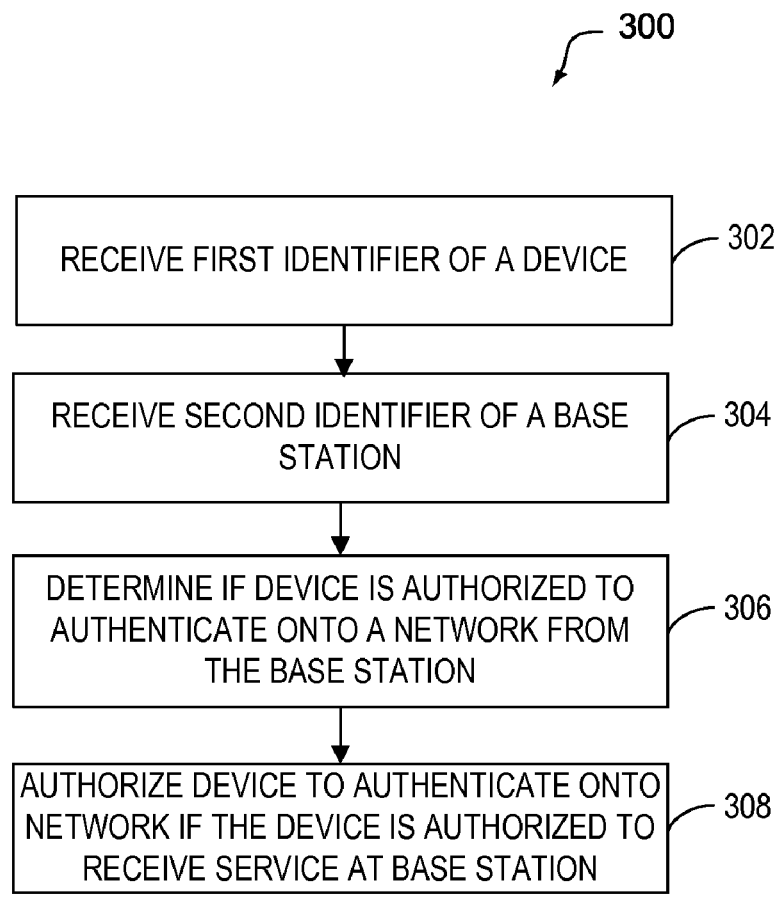
FIG. 3 is a flow diagram of an exemplary method for determining whether to allow a device to authenticate onto a wireless network from a particular base station.

FIG. 3 is a flow diagram of an exemplary method 300 for determining whether to allow a device to authenticate onto a wireless network from a particular BS. At operation 302, a first identifier of a device is received. The first identifier may be a MAC ID and may be received by a FNPS for example. At operation 304, a second identifier of a BS is received. The second identifier may be a BS ID and may also be received by the FNPS for example. At operation 306, a determination is made as to whether the device is authorized to authenticate onto a network from the BS based on an evaluation of the first and second identifiers. This determination may comprise, for example, the FNPS accessing a database, such as database 216, to determine if the two identifiers are associated with each other. At operation 308, the device is authorized to authenticate onto the network from the base station if it is determined that the device is authorized to receive service at the base station. In an embodiment, it can be determined that the device is authorized to receive service at the base station if the two identifiers are associated with each other within the database.

Figure 4:
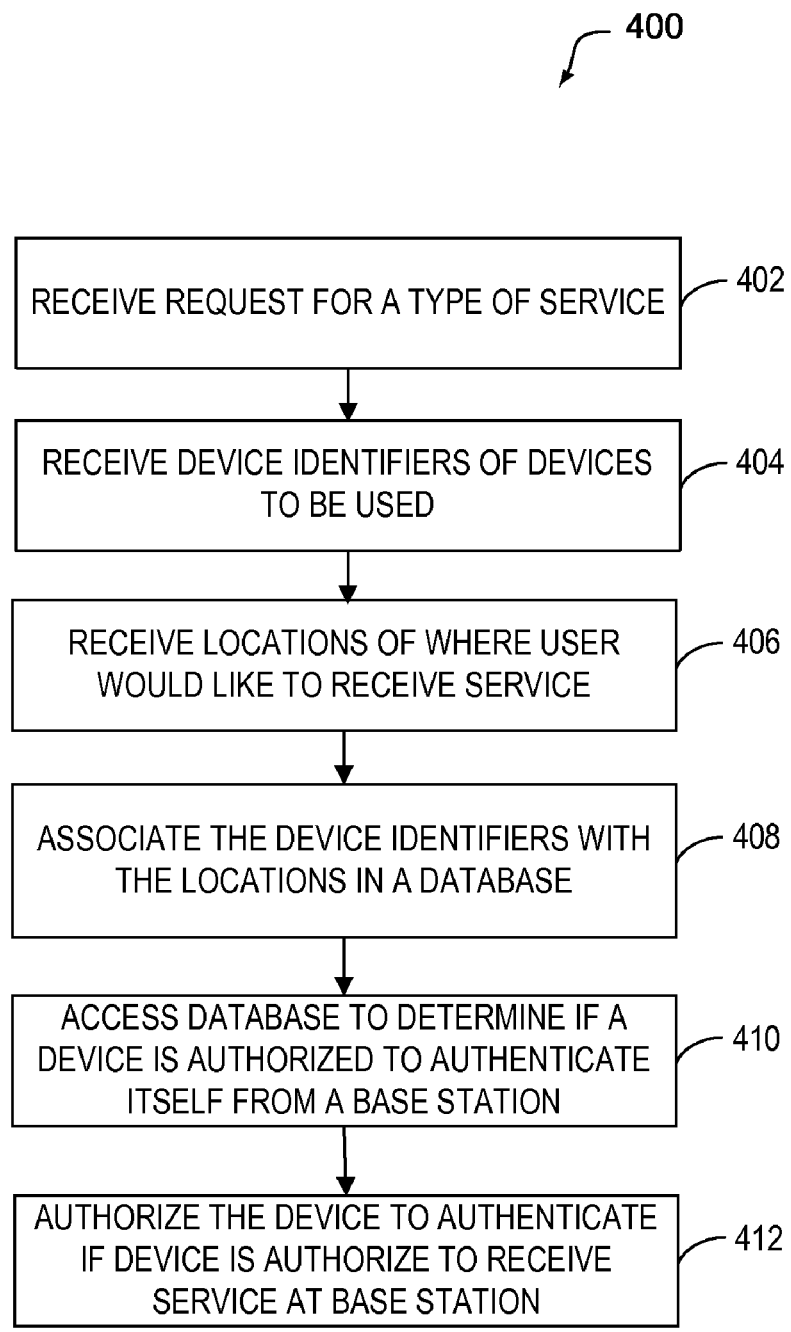
FIG. 4 is another flow diagram of an exemplary method for determining whether to allow a device to authenticate onto a wireless network from a particular base station.

FIG. 4 is another flow diagram of an exemplary method 400 for determining whether to allow a device to authenticate onto a wireless network from a particular BS. At operation 402, a request is received for a type of service from a user. The types of service may be, for example, either a fixed, nomadic, or fully-mobile HSWD service. At operation 404, device identifiers are received corresponding each device the user wishes to use to connect onto a network. The device identifiers may be, for example, MAC IDs. At operation 406, locations are received corresponding to where the user would like to receive wireless service onto the network. At operation 408, the device identifiers and the locations are associated and stored together within a database. In an embodiment, BS IDs corresponding to the received locations may also be associated and stored with the locations and device identifiers. At operation 410, a FNPS, for example, may respond to a request from a device to authenticate onto the network from a BS by accessing the database to determine if the device is authorized to authenticate itself from the BS. At operation 412, the device is authorized to authenticate onto the network from the BS if it is determined that the device is authorized to receive service at the BS. In an embodiment, it can be determined that the device is authorized to receive service at the base station if the device's device identifier is associated with the BS within the database.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more tangible computer-readable media having computer-useable instructions embodied thereon for performing a method of authorizing a device to authenticate onto a network from a base station, the method comprising:
receiving a Media Access Control identifier of the device at a provisioning system, wherein the provisioning system allows or prevents high-speed wireless data services to the device;
receiving a base station location identifier of the base station at the provisioning system;
determining by the provisioning system if the device is authorized to authenticate onto the network from the base station based on an evaluation of the Media Access Control identifier and base station location identifier, wherein determining by the provisioning system comprises determining if the Media Access Control identifier and the base station location identifier are associated together in a database;

authorizing the device to authenticate onto the network when it is determined that the device is authorized to receive service at the base station; and authenticating the device with at least an authentication, authorization, and accounting (AAA) server.

2. The media according to claim 1, further comprising disallowing the device to authenticate onto the network when it is determined that the device is not authorized to receive service at the base station.

3. The media according to claim 2, wherein the device is not allowed to authenticate onto the network from the base station if a location associated with the Media Access Control identifier is not associated with the base station location identifier within the database.

4. The media according to claim 3, wherein the Media Access Control identifier is associated with the base station location identifier if the device is authorized to receive service in the location of the base station.

5. The media according to claim 3, further comprising authorizing the device to authenticate onto the network from one or more other base stations if the Media Access Control identifier is associated with any locations managed by the one or more base stations within the database.

6. A system for authorizing a device to authenticate onto a network from a base station, comprising:

a plurality of devices wherein each device contains a Media Access Control identifier;

one or more base stations wherein each base station contains a base station identifier;

a provisioning manager for associating users, Media Access Control identifiers, types of requested high-speed wireless data service, and one or more locations for high-speed wireless data service together in a database, authorizing devices to authenticate onto a network from a base station when it is determined that the device is authorized to receive high-speed wireless data service at the base station when the Media Access Control identifier is associated with the base station identifier in the database, and disallowing the device to authenticate onto the network from the base station when it is determined that the device is not authorized to receive high-speed wireless data service at the base station, wherein the provisioning manager is located in a provisioning system that allows or prevents high-speed wireless data services to the device; and an authentication, authorization, and accounting (AAA) server for authenticating the device after the device is authorized from the base station when it is determined that the device is authorized to received high-speed wireless data service.

7. The system according to claim 6, wherein the device is authorized to receive high-speed wireless data service at the base station if a Media Access Control identifier of the device is associated with the base station within the database.

8. The system according to claim 6, wherein the base station identifier identifies the location of the base station.

9. The system according to claim 6, wherein the type of high-speed wireless data service is at least one of a fixed, nomadic, and fully-mobile service.

10. The system according to claim 6, wherein the device authenticates onto the network via a Worldwide Interoperability for Microwave Access authentication process.

11. One or more tangible computer-readable media having computer-useable instructions embodied thereon for performing a method of authorizing a device to authenticate onto a network from a base station, the method comprising:

receiving a request for a type of high-speed wireless data service;

receiving one or more device identifiers for one or more devices;

receiving a set of information about one or more locations for the high-speed wireless data service for each of the one or more devices;

associating the one or more device identifiers with the set of information within a database;

associating a set of base station location identifiers with the one or more device identifiers and the set of information;

accessing by a provisioning system the database to determine if a first device is authorized to authenticate onto a network from a base station, wherein the provisioning system allows or prevents high-speed wireless data services to the device;

authorizing the first device to authenticate onto the network when it is determined that the first device is authorized to receive the high-speed wireless data service at the base station; and authenticating the device with at least an authentication, authorization, and accounting (AAA) server.

12. The media according to claim 11, wherein the first device is authorized to authenticate onto the network from the base station if any of the one or more locations associated with an identifier of the first device are associated with a location of the base station within the database.

13. The media according to claim 12, further comprising receiving an identifier of the base station to determine the location of the base station.

14. The media according to claim 11, further comprising disallowing the first device to authenticate to the network from the base station when it is determined that the first device is not authorized to receive the high-speed wireless data service at the base station.

15. The media according to claim 14, wherein the first device is not allowed to authenticate onto the network from the base station if a location associated with an identifier of the first device is not associated with the location of the base station.

16. The media according to claim 11, wherein the type of high-speed wireless data service determined from a group including fixed, nomadic, and fully-mobile.

17. The media according to claim 16, further comprising establishing a first price for the fully-mobile service as a most expensive service and establishing a second price for the nomadic service as a second-most expensive service.

* * * * *